United States Patent
Liu et al.

(10) Patent No.: US 8,785,822 B2
(45) Date of Patent: Jul. 22, 2014

(54) GRILL HAVING FIRST AND SECOND ELECTROTHERMAL TUBES

(75) Inventors: Ta Chi Liu, Tainan (TW); Xiaofei Li, Fujian Province (CN)

(73) Assignee: Tsann Kuen (Zhangzhou) Enterprise Co., Ltd., Zhangzhou, Fujian (CN)

(*) Notice: Subject to any disclaimer, the term of this patent is extended or adjusted under 35 U.S.C. 154(b) by 1029 days.

(21) Appl. No.: 12/616,769

(22) Filed: Nov. 11, 2009

(65) Prior Publication Data

US 2010/0116811 A1 May 13, 2010

(30) Foreign Application Priority Data

Nov. 11, 2008 (CN) .......................... 2008 2 0146316

(51) Int. Cl.
*H05B 3/68* (2006.01)

(52) U.S. Cl.
USPC .................................................... 219/450.1

(58) Field of Classification Search
USPC ........................................................ 219/450.1
See application file for complete search history.

(56) References Cited

U.S. PATENT DOCUMENTS

| | | | |
|---|---|---|---|
| 4,917,006 A * | 4/1990 | Bowen et al. .................... 99/331 |
| 6,184,499 B1 * | 2/2001 | Antoine ......................... 219/404 |
| 6,262,399 B1 * | 7/2001 | Lau et al. .................... 219/450.1 |
| 8,053,707 B2 * | 11/2011 | Hoyles et al. ................. 219/404 |
| 2006/0163242 A1 * | 7/2006 | Ciancimino et al. ........ 219/450.1 |

* cited by examiner

*Primary Examiner* — William D Coleman
(74) *Attorney, Agent, or Firm* — Rabin & Berdo, P.C.

(57) ABSTRACT

A grill comprises a first and a second electrothermal tube respectively connected to an external power supply by a temperature control unit. At least one regional interval between the first and second electrothermal tube is smaller than the other, and the area forms a regional high temperature area. A regional high temperature area of the grill pan is provided by the two electrothermal tubes, and the two electrothermal tubes are respectively controlled.

4 Claims, 3 Drawing Sheets

GRILL HAVING FIRST AND SECOND ELECTROTHERMAL TUBES

FIELD OF THE INVENTION

The present invention relates to a grill.

RELATED ART

Known grills usually just have one electrothermal tube to heat, which make the grills have uniform temperature distribution, have no regional high temperature heating function, and cannot meet the needs of cooking of some foods. To solve the problem, some people change the arrangement of the electrothermal tube in the grill pan to achieve regional high temperature heating function of the grill. But the solution has a problem that the high temperature area cannot be controlled independently; if only the electrothermal tube is switched on, the high temperature area will be everlasting, which will waste electric energy when the high temperature heating function is not needed.

SUMMARY OF THE INVENTION

The invention provides a grill, which overcomes the disadvantages of known grills having only one electrothermal tube, can make the grill have controlled regional high temperature heating area.

The present invention adopts technical solution to overcome the shortcomings as follows:

A grill comprises a first and a second electrothermal tube respectively connected to an external power supply by a temperature control unit; wherein at least one regional interval between said first and second electrothermal tube is smaller than the other and the area forms a regional high temperature area.

According to a preferred embodiment of the present invention, said temperature control unit comprises a shell, an electronic temperature control rod for controlling the power on/off of said first electrothermal tube and a control switch for controlling the power on/off of said second electrothermal tube; the control switch is set on the surface of the shell.

According to a preferred embodiment of the present invention, said first electrothermal tube comprises a first polarized plug; said second electrothermal tube comprises a second polarized plug; the first polarized plug and the second polarized plug are closely set on a same side wall of the grill pan, and there is a temperature-sensing probe socket disposed near said first polarized plug and said second polarized plug; said electronic temperature control rod comprises a temperature-sensing probe matched with the temperature-sensing probe socket, a first polarized socket matched with the first polarized plug, a temperature adjustment knob set on the surface of said shell; said temperature control unit also comprises a second polarized socket matched with the second polarized plug.

According to a preferred embodiment of the present invention, said first electrothermal tube extends from one pole of the first polarized plug and surrounds the bottom of the grill pan and ends up in the other pole of the first polarized plug, and the first electrothermal tube covers most area of the bottom of the grill pan; said second electrothermal tube extends from one pole of the second polarized plug and surrounds the area covered by the first electrothermal tube and ends up in the other pole of the second polarized plug.

According to a preferred embodiment of the present invention, said first electrothermal tube and the second electrothermal tube are set on the bottom of the grill pan by stamping or pre-buried mode.

Compared with known grills in related art, the present invention provides a regional high temperature area of the grill pan by two electrothermal tubes, and the two electrothermal tubes are respectively controlled, which is operated expediently. When the first and second electrothermal tubes work at the same time, the temperature of the regional high temperature area will rise rapidly, which makes food can be heated rapidly and can cut down heat time. When the high temperature function is off, the power consumption of the grill can be cut down, which will save electric energy and can meet different cooking needs of different foods. The temperature control equipment for controlling the first electrothermal tube and the temperature control equipment for controlling the second electrothermal tube are set in the same temperature control unit, which makes the grill have a simple structure and be operated expediently.

DETAILED DESCRIPTION OF THE PREFERRED EMBODIMENTS

The invention will be further described according to the drawings and the embodiment.

Figure 1:
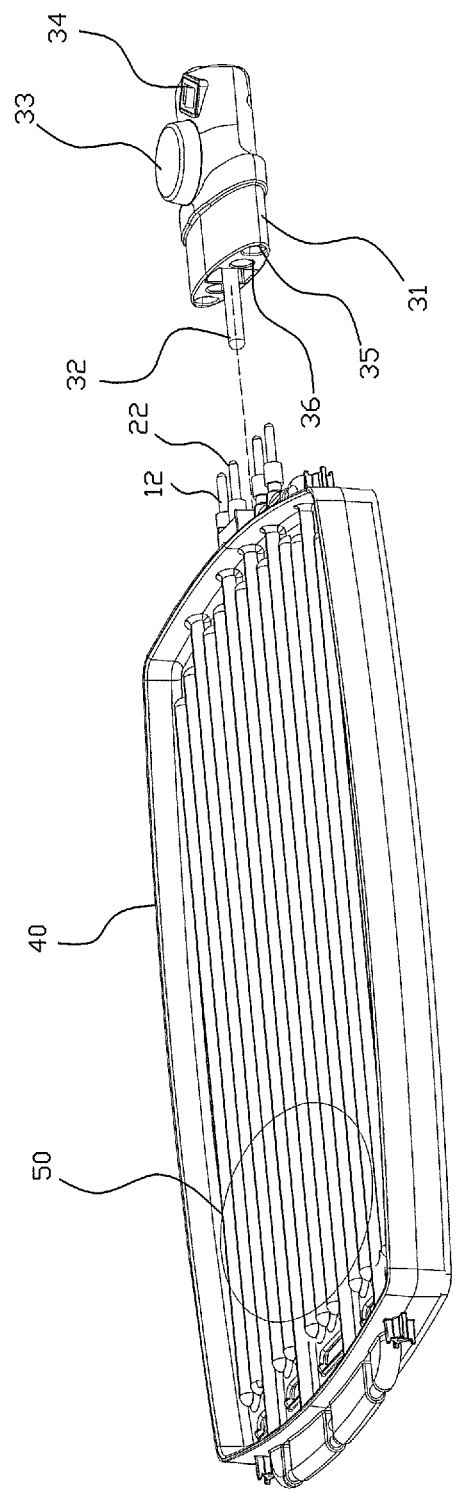
FIG. 1 is a three-dimensional view of the invention.
Figure 2:
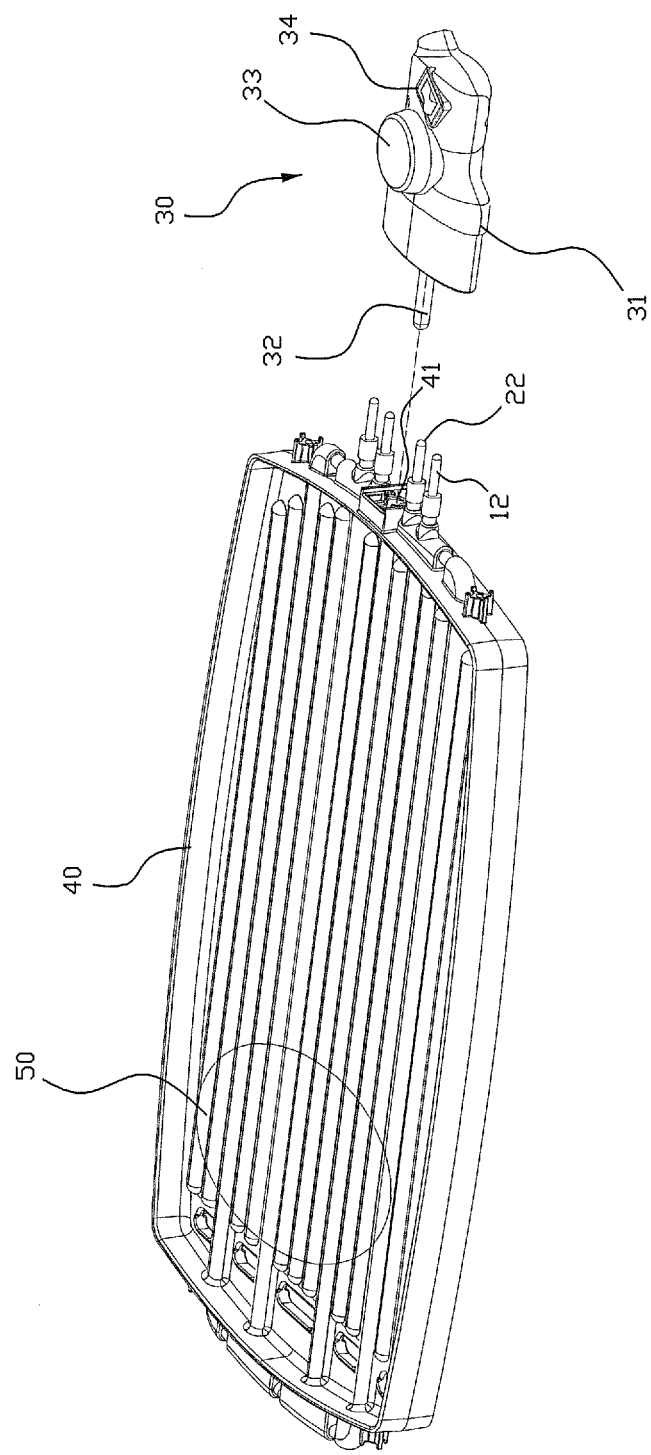
FIG. 2 is another three-dimensional view of the invention.
Figure 3:
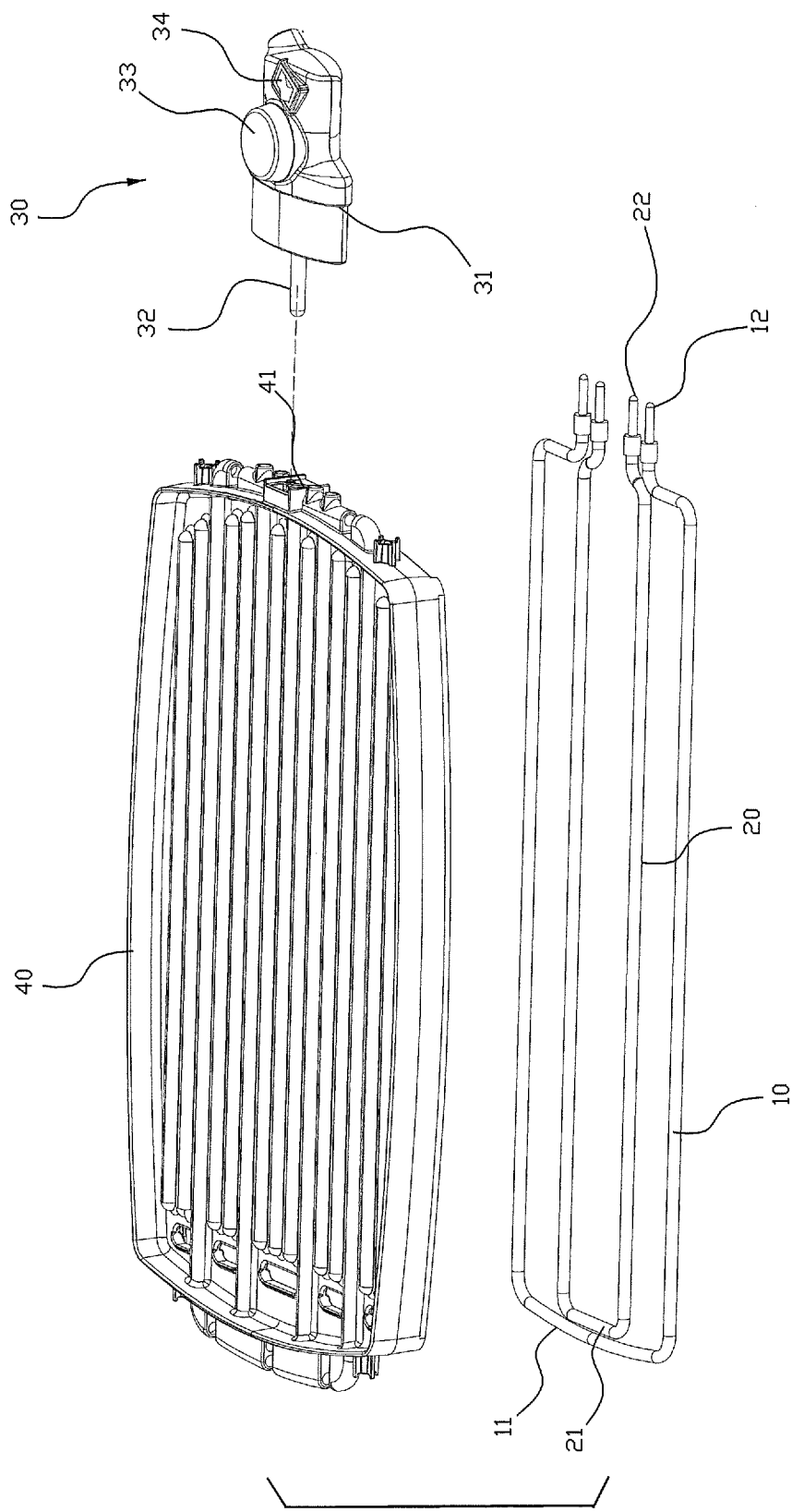
FIG. 3 is an exploded view of the invention.

Referring to FIGS. 1 to 3, The grill of the invention comprises a first electrothermal tube 10 and a second electrothermal tube 20 on the bottom of the grill pan 40 by stamping or pre-buried mode. Both the first electrothermal tube 10 and the second electrothermal tube 20 are rectangle. The second electrothermal tube 20 is set in the area covered by the first electrothermal tube 10. The reginal interval between one side 11 of the first electrothermal tube 10 and one side 21 of the second electrothermal tube 20 is smaller than the other, and the area forms a regional high temperature area 50 on the surface of the grill pan 40. The first electrothermal tube 10 comprises a first polarized plug 12; the second electrothermal tube 20 comprises a second polarized plug 22; the first polarized plug 12 and the second polarized plug 22 are closely set on a same side wall of the grill pan 40, and there is a temperature-sensing probe socket 41 disposed near the first polarized plug 12 and the second polarized plug 22.

The first electrothermal tube 10 and the second electrothermal tube 20 are respectively connected to an external power supply by an electronic temperature control rod and a control switch 34. The first electrothermal tube 10 is controlled power on/off by the electronic temperature control rod, and the second electrothermal tube 20 is controlled power on/off by the control switch 34. The electronic temperature control rod and the control switch 34 are set on the temperature control unit 30. The temperature control unit 30 comprises a shell 31, and the control switch 34 is set on the upper surface of the shell 31. The electronic temperature control rod comprises a temperature-sensing probe 32 matched with the temperature-sensing probe socket 41, a first polarized socket 35 matched with the first polarized plug 12, a temperature adjustment knob 33 set on the upper surface of said shell 31; the temperature control unit 30 also comprises a second polarized socket 36 matched with the second polarized plug 22. The first polarized socket 35, the temperature-sensing probe 32 and the second polarized socket 36 respectively accept or are inverted into the first polarized plug 12, the temperature-sensing probe socket 41 and the second polarized plug 22.

In using, the first electrothermal tube 10 is controlled power on/off by the electronic temperature control rod, and the second electrothermal tube 20 is controlled power on/off by the control switch 34, the first electrothermal tube 10 and the second electrothermal tube 20 are respectively controlled, which is operated expediently. When both the first electrothermal tube 10 and the second electrothermal tube 20 work at the same time, the temperature of the regional high temperature area 50 will rise rapidly, which make food can be heated rapidly and can cut down heat time. When regional high temperature function isn't needed, the second electrothermal tube 20 can be controlled power off by the control switch 34, the power consumption of the grill can be cut down, which will save electric energy and can meet different cooking needs of different foods.

In addition, the electronic temperature control rod for controlling the first electrothermal tube 10 and the control switch 34 for controlling the second electrothermal tube 20 are set in the same temperature control unit 30, which makes the grill have a simple structure and be operated expediently.

The foregoing description of the exemplary embodiment of the invention has been presented for the purposes of illustration and description. It is not intended to be exhaustive or to limit the invention to the precise form disclosed. Many modifications and variations are possible in light of the above teaching. For example: the electronic temperature control rod can be replaced by mechanical switch; the control switch can be replaced by electronic temperature control rod; the first electrothermal tube and the second electrothermal tube can be round or oval; there can be two or more high temperature areas. In a word, all changes that come within the meaning and range of equivalency of the claims are to be embraced within their scope.

What is claimed is:

1. A grill, comprising:
   a first electrothermal tube arranged to have a first rectangular shape having four sides;
   a second electrothermal tube arranged to have a second rectangular shape having four sides, and being smaller than and disposed within the first rectangular shape, a first side of the first rectangular shape being parallel to and disposed at a first interval from a first side of the second rectangular shape to define a first regional interval between said first and second electrothermal tubes, a second side of the first rectangular shape being parallel to and disposed at a second interval from a second side of the second rectangular shape, a third side of the first rectangular shape being parallel to and disposed at a third interval from a third side of the second rectangular shape, the first interval being smaller than the second and third intervals, the first interval forming a regional high temperature area; and
   a temperature control unit, the first and second electrothermal tubes being connected to an external power supply by the temperature control unit, said temperature control unit comprising:
   a shell:
   an electronic temperature control rod for controlling a power on/off of said first electrothermal tube; and
   a control switch for controlling a power on/off of said second electrothermal tube, said control switch being set on a surface of said shell, the second electrothermal tube being selectively activatable both separate from and simultaneously with an activation of the first electrothermal tube, so that when both the second electrothermal tube and the first electrothermal tube are simultaneously activated, the regional high temperature area has an increased temperature, and when the second electrothermal tube is not activated and the first electrothermal tube is activated, the regional high temperature area has a decreased temperature.

2. The grill according to claim 1, further comprising a grill pan; wherein said first electrothermal tube comprises a first polarized plug; said second electrothermal tube comprises a second polarized plug; the first polarized plug and the second polarize plug being closely set on a same side wall of the grill pan; a temperature-sensing probe socket being disposed near said first polarized plug and said second polarized plug; wherein said electronic temperature control rod comprises a temperature-sensing probe matched with the temperature-sensing probe socket, a first polarized socket matched with the first polarized plug, a temperature adjustment knob set on the surface of said shell; said temperature control unit also comprises a second polarized socket matched with the second polarized plug.

3. The grill according to claims 1, wherein said first electrothermal tube and said second electrothermal tube are set on a bottom of the gill pan by stamping or pre-buried mode.

4. The grill according to claim 2, wherein said first electrothermal tube extends from one pole of the first polarized plug and surrounds a bottom of the grill pan and ends up in an other pole of the first polarized plug, and the first electrothermal tube covers most of an area of the bottom of the grill pan; said second electrothermal tube extends from one pole of the second polarized plug and surrounds the area covered by the first electrothermal tube and ends up in an other pole of the second polarized plug.

* * * * *